Patented Aug. 4, 1942

2,292,316

UNITED STATES PATENT OFFICE 2,292,316

CURING GLUE STOCK

Edward F. Christopher, Chicago, Ill., assignor to Industrial Patents Corporation, Chicago, Ill., a corporation of Delaware No Drawing. Original application December 9, 1938, Serial No. 244,775. Divided and this application December 10, 1940, Serial No. 369,463

10 Claims. (Cl. 260—118)

This invention relates to a method of curing gelatinous material stock, particularly bones.

This application is a division of my co-pending application entitled Method of curing glue stock, Serial No. 244,775, filed December 9, 1938.

One of the objects of this invention is to provide a method of treating bones to yield high test gelatinous material.

Another object of this invention is to provide a method of cleaning bones preparatory to the extraction of gelatinous material therefrom.

Further objects and advantages will become apparent from the description and claims which follow.

The present invention contemplates the treatment of green bones with a small amount of water soluble soap.

The term "gelatinous material" is used herein and it is to be understood to designate all grades of animal gelatin and glue including those intermediate products commonly known as "low grade gelatin" and "high grade glue."

In the conventional practice of extracting gelatinous material, for example, glue from bones, the green or fresh bones are crushed and washed with cold water to remove foreign matter, such as, blood and dirt from the surface. After draining, the crushed bones are cooked under steam pressure. I have discovered that if the green or fresh bones are first treated with a small amount of a water soluble soap the final product is a much higher grade material. This treatment of green bones results in a coagulation of blood and certain albuminous materials and permits these materials to be easily washed away to produce a clean type of bone. The treatment of bones with the soap and subsequent washing effects a removal of adulterants or diluents. These inert substances, such as blood and certain albuminous materials, dilute the glue or gelatin and thereby lower the jelly strength and viscosity.

Suitable soluble soaps which may be employed in cleaning green bones are the sodium and potassium soaps made from the fatty acids of common animal and vegetable fats and oils, such as sodium and potassium oleates, laurates, stearates, palmitates, and the like. For the purposes of the present invention, potassium cocoanut oil soap is one of the most convenient of the soluble soaps since it is liquid at normal temperatures, and the free fatty acid appears to possess germicidal properties which are more pronounced than those of the other common fatty acids.

In the extraction of gelatinous material, for example, glue, from green bones, according to my invention the bones are crushed and placed in a cooking vessel. A small amount of a soluble soap is then added together with a sufficient amount of water to cover the bones. I have found that the addition of 0.25 per cent potassium cocoanut oil soap, based upon the weight of the bones, is very satisfactory. The bones and soap solution are then heated for a short period of time, for example, heated to about 170 degrees F. to 180 degrees F. for a period of from 15 to 60 minutes. The soap solution is then allowed to drain and the bones rinsed or washed with warm water to remove the soap and any other material which may have been released during the soap treatment. The bones are then cooked under steam pressure in the conventional manner after which they are covered with hot water to extract the gelatinous matter. The extract containing gelatinous matter is drained and the cooking process repeated at increasing pressures at each cook until all of the glue or gelatin has been extracted. The extracted dilute solution is concentrated, chilled, and dried in any conventional manner.

The properties of glue and gelatin prepared from green bones treated with a water soluble soap are superior to the properties of glue and gelatin prepared by conventional methods.

The following table illustrates the improvement in the properties of glue extracted from green bones by my method compared with glue extracted from green bones by the conventional method:

*Average test of glue made from green bone with the soap treatment*

| Jelly test in bloom | Viscosity in millipoises |
|---|---|
| 169 | 98 |

*Average test of glue made from green bone without treatment*

| Jelly test in bloom | Viscosity in millipoises |
|---|---|
| 80 | 40 |

The temperature and time at which the green bones are treated with soap are not critical and may be varied as desired, the specific temperature and time set forth above having been found to be convenient. It is apparent that if lower temperatures are employed the time of treatment will necessarily be greater. If higher temperatures are employed the time of treatment may be reduced. However, it is not feasible to increase the temperature too much since high temperatures adversely affect the properties of the glue and gelatin.

I claim:

1. The method of preparing gelatinous material from bones which comprises heating the bones in a dilute solution of a water soluble soap, separating the solution from the bones, and thereafter extracting the gelatinous material from the bones.

2. The method of preparing gelatinous material from bones which comprises heating the bones in a dilute solution of a water soluble soap, separating the soap solution from the bones, washing the bones, and extracting the gelatinous material from the bones.

3. The method of preparing gelatinous material from bones which comprises heating the bones in a dilute solution of a water soluble potassium soap, separating the soap solution from the bones and extracting the gelatinous material from the bones.

4. The method of preparing gelatinous material from bones which comprises heating the bones in a dilute solution of a water soluble sodium soap, separating the soap solution from the bones and extracting the gelatinous material from the bones.

5. The method of preparing gelatinous material from bones which comprises heating the bones in a solution containing 0.25 per cent potassium coconut oil soap, based upon the weight of the bones, at a temperature between 170 degrees F. and 180 degrees F. for from fifteen to sixty minutes, separating the soap solution from the bones, washing the bones, and extracting the gelatinous material from the bones.

6. In the preparation of gelatinous material from bones, the treatment of the bones with a solution containing a water soluble soap at a sufficiently high temperature and for a sufficient period of time to permit blood and albuminous material to be washed from the bones before extraction of the gelatinous material.

7. In the preparation of gelatinous material from bones, the treatment of the bones with a dilute solution of a water soluble soap at a sufficiently high temperature and for a sufficient period of time to permit blood and albuminous material to be washed from the bones before extraction of the gelatinous material.

8. In the preparation of gelatinous material from bones, the treatment of the bones with a dilute solution of potassium coconut oil soap at a sufficiently high temperature and for a sufficient period of time to permit blood and albuminous material to be washed from the bones before extraction of the gelatinous material.

9. In the preparation of gelatinous material from bones, the treatment of the bones with a dilute solution of a water soluble sodium soap at a sufficiently high temperature and for a sufficient period of time to permit blood and albuminous material to be washed from the bones before extraction of the gelatinous material.

10. In the preparation of gelatinous material from bones, the treatment of the bones with a solution containing 0.25 per cent potassium coconut oil soap, based on the weight of the bones, at a temperature between 170 degrees F. and 180 degrees F. for a sufficient period of time to permit blood and albuminous material to be washed from the bones before extraction of the gelatinous material.

EDWARD F. CHRISTOPHER.